(12) United States Patent
Furuyama

(10) Patent No.: US 6,741,781 B2
(45) Date of Patent: May 25, 2004

(54) OPTICAL INTERCONNECTION CIRCUIT BOARD AND MANUFACTURING METHOD THEREOF

(75) Inventor: Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 88 days.

(21) Appl. No.: 09/961,372

(22) Filed: Sep. 25, 2001

(65) Prior Publication Data

US 2002/0039475 A1 Apr. 4, 2002

(30) Foreign Application Priority Data

Sep. 29, 2000 (JP) ........................................ 2000-301062

(51) Int. Cl.⁷ ................................................ G02B 6/10
(52) U.S. Cl. ........................... 385/129; 385/14; 385/47; 385/48; 385/31
(58) Field of Search ........................... 385/129, 14, 47, 385/48, 31

(56) References Cited

U.S. PATENT DOCUMENTS

| 5,394,490 A | * | 2/1995 | Kato et al. | 385/14 |
| 5,446,814 A | * | 8/1995 | Kuo et al. | 385/31 |
| 6,154,582 A | * | 11/2000 | Bazylenko et al. | 385/14 |
| 6,259,841 B1 | * | 7/2001 | Bhagavatula | 385/47 |

FOREIGN PATENT DOCUMENTS

| JP | 2-248096 | 10/1990 |
| JP | 5-264833 | 10/1993 |
| JP | 7-325231 | 12/1995 |
| JP | 8-264748 | 10/1996 |
| JP | 11-72636 | 3/1999 |
| JP | 2000-114581 | 4/2000 |

OTHER PUBLICATIONS

T. Matsumoto, et al., Japanese Journal of Applied Physics, Part 1, vol. 36, No. 3B, pp. 1903–1906, "Polymide Optical Waveguide with Multi–Fan–Out for Multi–Chip Module Application", Mar. 30, 1997.

Seungug Koh, et al. "Guided–Wave Optoelectronic Clock Distribution Networks on Multichip Modules Using MEMS Fabrication Techniques", Society of Photo–Optical Instrumentation Engineers (SPIE) vol. 3288 1998 pp. 79–84.

Takuji Matsumoto, et al. "Polyimide Optical Waveguide with Multi–Fan–Out for Multichip Module System", Society of Photo–Optical Instrumentation Engineers (SPIE) vol. 3288. 1998 pp. 133–144.

* cited by examiner

*Primary Examiner*—Audrey Chang
*Assistant Examiner*—Denise S. Allen
(74) *Attorney, Agent, or Firm*—Oblon, Spivak, McClelland, Maier & Neustadt, P.C.

(57) ABSTRACT

In an optical connection board, a first clad layer is formed on a flat surface of a substrate and a core layer is formed on the first clad layer and is extended in a propagation direction of an optical signal. The core layer is covered with a second clad layer. A termination mirror having a reflection face is so buried in the clad layer as to reflect the optical signal guided in the core layer, to the outside of the optical connection board.

6 Claims, 12 Drawing Sheets

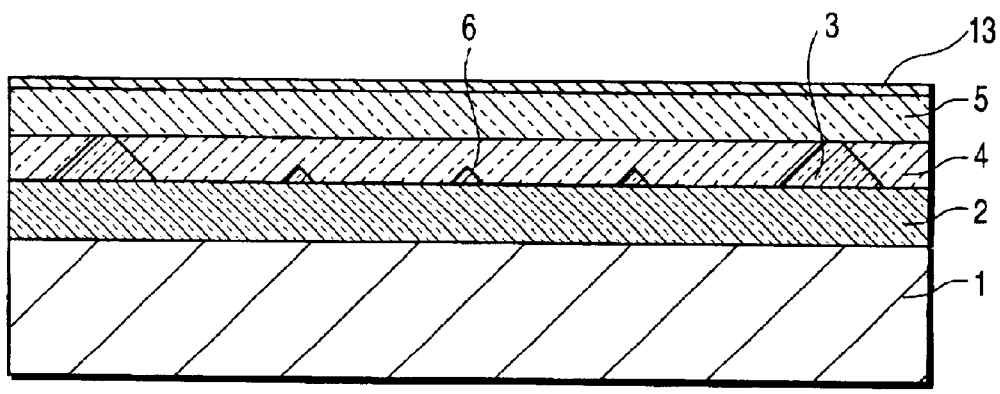
F I G. 16A
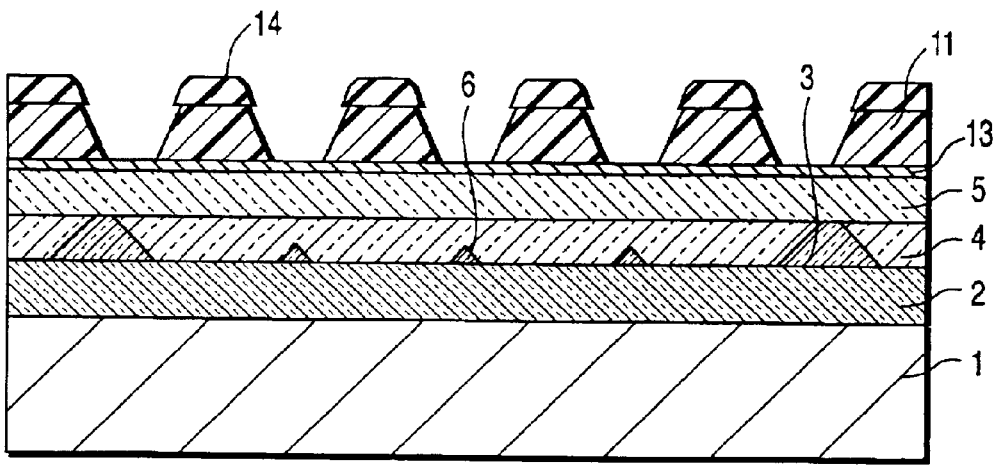
F I G. 16B
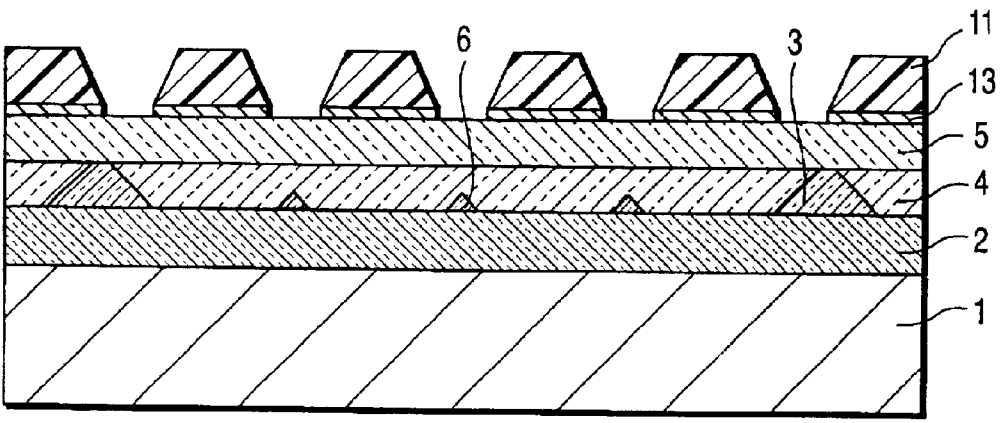
F I G. 16C

OPTICAL INTERCONNECTION CIRCUIT BOARD AND MANUFACTURING METHOD THEREOF

CROSS-REFERENCE TO RELATED APPLICATIONS

This application is based upon and claims the benefit of priority from the prior Japanese Patent Application No. 2000-301062, filed Sep. 29, 2000, the entire contents of which are incorporated herein by reference.

BACKGROUND OF THE INVENTION

1. Field of the Invention

The present invention relates to an optical interconnection circuit board and a method of manufacturing the circuit board. More particularly, the invention relates to an optical interconnection circuit board having an optical waveguide for optically connecting different LSIs at high speeds and to a method of manufacturing the circuit board.

2. Description of the Related Art

Recently, electronic devices as bipolar transistors and field-effect transistors have been improved in terms of their performance. The clock frequency of the LSI has increased so that the LSI may operate at a remarkably high speed. However, the operating speed of a printed circuit board with LSIs mounted thereon is designed to operate at a speed lower than the operating speed of each LSI. The operation speed of the rack on which the printed circuit board is mounted is suppressed to be even lower. This is because the clock frequency must be lowered to prevent the deterioration of signals. In this regard, it should be noted that the transmission loss in the wires, the signal noise and the electromagnetic trouble increase as the operation clock frequency increases. To reduce the deterioration of the signal it is necessary to lengthen the wires that connect the LSIs. In view of this, the operation frequency cannot be raised as high the internal operation clock frequency of the LSI. Even if the LSIs, which are active devices, can operate high speeds, there is no way but decreasing the operating speed of an electronic wiring module.

In views of the aforementioned problem of the electronic wiring module, several optical connection modules for connecting the LSIs have been proposed. The optical connection module virtually has no frequency dependency, in terms of loss in a frequency region from DC to tens gigahertz or more. It has no electromagnetic troubles or causes no noise even if the ground potential change in the wiring path. Therefore, the optical connection module can transmit signals at tens of Gbps is possible. The optical connection module can operate at a very high speed on printed circuit boards or on the rack holding a printed circuit board.

To provide such an optical connection module, it is necessary to connect LSIs by optical waveguides or optical fibers. Generally, the optical connection in an optical connection module is achieved by aligning and connecting substrates, each having a flat optical waveguide, or by aligning and connecting optical fibers. Since it takes much time to align the substrates or optical fibers, the productivity of the optical connection module is inevitably lower that that of the electronic wiring module that comprises LSIs. To mount an electronic element, such as a semiconductor laser, a photodiode or the like, on an optical connection module, a notch is made in the optical waveguide and the electronic element is set in the notch. The position of the notch and the kind of the element set in the notch differ from module to module. This means that optical connection modules need to be designed, one by one.

The substrate of the optical connection module is generally flat. The light input/output part therefore extends at right angles to the substrate. An optical-path angle converter for changing the optical path by 90° is provided in the optical waveguide, and the optical components are mounted on the substrate. However, no optical-path angle converters have been realized, which are highly productive and efficient.

Hitherto, various methods have been practiced to mount the optical components. In one method, the optical waveguide is mechanically cut at 45° to reflect a light beam at right angles. In another method, a 45°-mirror is mounted at an output port of the optical waveguide. The method of cutting the optical waveguide at 45° can be used, but only at the ends of the connection module. A method of cutting the optical waveguide obliquely by dicing or laser process is generally employed. Another method of grinding the optical waveguide obliquely for each substrate is well known.

Of the methods of providing the 45°-mirrors, the method of aligning micro 45°-mirrors with an optical terminal is the simplest. To reduce mechanical arranging process, a new method has been proposed. In this method, the optical waveguide board and the micro mirrors are produced separately and bonded together. (See, for example, Society of Photo-Optical Instrumentation Engineering: SPIE Vol.3288, p.79).

FIG. 1 shows the optical waveguide board provided with micro mirrors described in the above document. As FIG. 1 shows, the micro 45°-mirrors 3 are provided on the mirror board 1. Note that reference numeral 15 denotes an optical waveguide board, reference numeral 4 designate an optical waveguide core layer, and reference numerals 2 and 5 represent clad layers. In FIG. 1, the arrows indicate the direction in which optical signals travel. Optical devices, LSIs and the like are mounted on the substrate 15 and electrically connected.

In these methods, an optical beam can undergo orthogonal transform. With the method of cutting the optical waveguide, however, it is difficult to form an optical input/output portion at any position and in any direction in the substrate. If many optical input/output portions are provided, the productivity will decrease. In the method of mounting external mirrors, not only the substrate becomes complicated, but also mounting failure or pollution is likely to occur because these mirrors are mechanically mounted. The problems described above hamper an increase in the productivity of the optical connection modules, rendering it difficult to manufacture highly general-purpose optical connection modules at low cost.

Jan. Pat. Appln. KOKAI Publication No. 2000-114581 discloses a method, in which active devices, such as semiconductor laser, photo diode and driving IC, are buried in the optical interconnection circuit board. The active devices are electrically connected to an electric wiring substrate. The electric wiring substrate is mounted on the optical connection board. Another method is proposed in Society of Photo-Optical Instrumentation Engineers: SPIE Vol.3288, p.133. In this method, the substrate is made rough at one surface to deform its lower clad layer, and a mirror is mounted on the deformed portion.

In the first-mentioned method, the LSI is mounted by ordinary electric connection. An ordinary mounting scheme such as soldering reflow can therefore be applied. However, the active devices are buried in the mounting substrate, the structure can hardly enlarged to tens of centimeters due to thermal distortion, and wiring for the mounting is not suitable for general purpose. In the second-mentioned method, the optical waveguide and electric wiring are formed on the optical connection board, without performing any other treatment. The structure can be easily enlarged, and its mounting wiring pattern can be altered by changing the photolithography mask to another.

FIG. 2 shows the structure based on Society of Photo-Optical Instrumentation Engineers: SPIE Vol.3288, p.133. In FIG. 2, reference numeral 1 designates a substrate, reference numeral 2 a cladding layer of the optical waveguide, reference numeral 4 a core layer of the optical waveguide, reference numeral 5 a cladding layer of the optical waveguide, and reference numeral 3 denotes a buried mirror provided directly in contact with the optical waveguide core layer 4. As shown in FIG. 2, the substrate 1 and the cladding layer 2 have an uneven surface. The buried mirror 3 is formed by vapor-depositing metal on a slope corresponding to the border of the unevenness of the cladding layer 2. With this conventional structure, the light wave traveling through the optical waveguide is partially picked up. In the structure of FIG. 2, the intermediate terminal of optical bus functions as an optical tap. Here, the mirror 3 functions as an optical split mirror.

In this conventional structure, the height of the split mirror 3 is less than the thickness of the optical waveguide core layer 4. The split mirror 3 is buried in the optical waveguide core layer 4. Therefore, the mirror 3 splits a part of guided light wave, and the remaining part of the light wave can be distributed to a following optical waveguide to guide the light wave from the split mirror 3. Since the optical waveguide is a multi-mode waveguide, the light wave split by the mirror 3 can mix with the light wave passing over the mirror 3. Hence, optical distribution can be designed easily by simulating the traveling of the light wave. Further, the light wave thus guided can be input to the optical split portion from outside. The basic function as a signal bus can therefore be realized with a simple structure.

However, the substrate 1 and the lower clad layer 3 have an uneven surface in this conventional structure. The core layer 4 inevitably has an uneven surface. The energy loss in the light wave traveling through the optical waveguide is large. That is, the guided light wave produces a mode transformation loss at the border of the unevenness or at a bent portion of the core layer 4. The loss is greater than in a flat optical waveguide. This conventional structure is disadvantageous in that the energy loss in the guided light wave is too large. Since the buried mirror 3 is designed to achieve partial splitting, it, used as an optical path transformation mirror for optical transmission, reduces the opening area of a light incident section to a value less than the sectional area of the optical waveguide. Assume that vertical splitting efficiency of the buried type mirror 3 is 10% ($\frac{1}{10}$ split). Then, the sectional area of the optical transmission beam needs to be $\frac{1}{10}$ the sectional area of the optical waveguide.

Generally, converging light beam results in an increase in the divergent angle of the beam. In view of this, it is no use to converge the beam so much that an angle exceeds a numeral aperture of an optical waveguide. Here arises the problem that optical coupling efficiency of the optical transmission portion may fall in some cases. This problem cannot help but be accepted as necessity. Nonetheless, it leads to an energy loss in the optical transmission of a one-way distribution of signal. Further, at an end portion of the optical waveguide, the guide light wave other than split light may emerge from the waveguide or may be reflected in an opposite direction. In this case, crosstalk will occur with other optical waveguide, or multi-reflection will take place in the optical waveguide. This generates a delay noise signal.

In the conventional structure described above, the split mirror or the buried mirror 3 is inclined due to deformation of the substrate. It is therefore required that the unevenness be made in the substrate and, hence, in the lower clad layer, too. This structure imposes restrictions on the material, size and the like of the substrate material. Consequently, the process of controlling the unevenness and the depth therefore is complicated, and the manufacturing method is difficult to control. To avoid this problem, the substrate may be made by molding. This method can indeed applied to mass-produce the same substrates. However, it requires a large initial investment for the mold, and the wiring pattern cannot be altered easily. In other words, this method is not a general-purpose one.

As described above, in the optical connection board for optically connecting LSIS, a highly practical 90°-optical path transform mechanism has not been yet realized. The productivity cannot be raised, and the manufacturing cost cannot be lowered.

BRIEF SUMMARY OF THE INVENTION

Accordingly, an object of the present invention is to provide an optical connection board and a method of manufacturing the same, each capable of realizing a 90°-optical path transform mechanism that minimizes an optical coupling loss and accomplishes optical termination when the LSIs are mounted on the general-purpose optical connection board, thereby enhance the productivity and reduce the manufacturing cost.

To achieve the object, according to one aspect of the present invention, there is provided an optical interconnection circuit board for guiding an optical signal, comprising:

a substrate having a surface;

a first clad layer having a flat surface, which is formed on the surface of the substrate;

a core layer configured to guide the optical signal in a predetermined direction, formed on the flat surface of the first clad layer and extended in the predetermined direction;

a second clad layer formed on the core layer; and a first mirror segment having a first mirror face configured to reflect the optical signal guided in the core layer through the second clad layer to the outside thereof, the first mirror segment being formed on the flat surface of the first clad layer, and the first mirror face being contacted to the core layer.

According to second aspect of the present invention, there is also provided an optical interconnection circuit board for guiding an optical signal, comprising:

a substrate having a surface;

a first clad layer having a flat surface, which is formed on the surface of the substrate;

a core layer configured to guide the optical signal in a predetermined direction, formed on the flat surface of the first clad layer and extended in the predetermined direction;

a second clad layer formed on the core layer;

a first termination mirror segment having a first tip end and a first mirror face configured to reflect the optical signal guided in the core layer through the second clad layer to the outside thereof, the first termination mirror segment being formed on the flat surface of the first clad layer and extending across the core layer in a lateral direction crossing the predetermined direction, the first tip end contacting the second clad layer, and the first mirror face being contacted to the core layer;

a second termination mirror segment having a second tip end and a second mirror face configured to reflect the optical signal into the core layer, the optical signal being incident on the second mirror segment from the outside of the circuit board through the second clad layer, the second mirror segment being formed on the flat surface of the first clad layer and extending across the core layer in the lateral direction, the second tip end contacting the second clad layer, and the second mirror face being contacted to the core layer; and a first splitting mirror segment having a third mirror face configured to reflect a part of the optical signal guided from the second termination mirror segment through the second clad layer to the outside thereof and to allow the remaining optical signal to pass over the first splitting mirror segment, the first splitting mirror segment being formed on the flat surface of the first clad layer between the first and second termination mirror segment, and the third mirror face being contacted to the core layer.

Further, according to third aspect of the present invention, there is also provided an n optical interconnection circuit board for guiding an optical signal, comprising:

a substrate having a surface;

a first clad layer having a flat surface, which is formed on the surface of the substrate;

a core layer configured to guide the optical signal in a predetermined direction, formed on the flat surface of the first clad layer and extended in the predetermined direction;

a second clad layer formed on the core layer;

a first splitting mirror segment having a first mirror face configured to split the optical signal into first and second optical signal components and guide the first and second optical signal components into the core layer, the optical signal being incident on the first splitting mirror from the outside of the circuit board through the second clad layer, the first splitting mirror segment being formed on the flat surface of the first clad layer, and the first mirror face being contacted to the core layer;

a first termination mirror segment having a first tip and a second mirror face configured to reflect the first optical signal component guided in the core layer through the second clad layer to the outside thereof, the first termination mirror segment being formed on the flat surface of the first clad layer and extending across the core layer in a lateral direction crossing the predetermined direction, the first tip end contacting the second clad layer, and the second mirror face being contacted to the core layer; and a second termination mirror segment having a second tip and a third mirror face configured to reflect the second optical signal component guided in the core layer to the optical unit through the second clad layer, the second termination mirror segment being formed on the flat surface of the first clad layer and extending across the core layer in the lateral direction, the second tip end contacting the second clad layer, and the third mirror face being contacted to the core layer.

Furthermore, according to fourth aspect of the present invention, there is also provided an n optical interconnection circuit board for guiding an optical signal, comprising:

a substrate having a surface;

a first clad layer having a flat surface, which is formed on the surface of the substrate;

a first core segment configured to guide the optical signal in a first predetermined direction, formed on the flat surface of the first clad layer and extended in the first predetermined direction;

a second core segment configured to guide the optical signal in a second predetermined direction different from the first predetermined direction, formed on the flat surface of the first clad layer and extended in the second predetermined direction;

an optical coupling mirror configured to optically couple the first core segment to the second core segment, the optical signal guided in the first core segment being reflected from the optical coupling mirror, the optical coupling mirror being formed on the flat surface of the first clad layer and contacted to the first and second core segments, and extending in the third predetermined direction different from the first and second directions;

a second clad layer formed on the first and second core segments and the optical coupling mirror; and a reflection layer formed on the second clad layer, configured to reflect the optical signal from the optical coupling mirror and redirect the optical signal to the optical coupling mirror through the second clad layer, the redirected optical signal being reflected from the optical coupling mirror into the second core segment and propagated in the second core segment.

Still further, according to a fifth aspect of the present invention, there is provided a method of manufacturing an optical interconnection circuit board for guiding an optical signal, comprising:

preparing a substrate having a surface;

forming a first clad layer having a flat surface, on the surface of the substrate;

forming a mirror layer on the first clad layer;

etching the mirror layer to form a mirror segment having a reflection face thereon and having a first height;

forming a core segment on the first clad layer, the core segment having a second height not greater than the first height and being so extended as to have a predetermined optical circuit pattern; and covering the core segment with a second clad layer.

Still furthermore, according to a sixth aspect of the present invention, there is provided a method of manufacturing an optical interconnection circuit board for guiding an optical signal, comprising preparing a substrate having a surface;

forming a first clad layer having a flat surface, on the surface of the substrate;

forming a mask layer on the first clad layer, the mask layer having an opening region;

depositing a mirror layer on the first clad layer under the opening region of the mask layer to form a mirror on the first clad layer, the mirror having a reflection face thereon and having a first height;

forming a core segment on the first clad layer, the core segment having a second height not greater than the first height and being so extended as to have a predetermined optical circuit pattern; and covering the core segment with a second clad layer.

BRIEF DESCRIPTION OF THE SEVERAL VIEWS OF THE DRAWING

FIGS. 16A to 16C are sectional views explaining a method of manufacturing an optical connection board according to a ninth embodiment of the present invention;

DETAILED DESCRIPTION OF THE INVENTION

Optical connection boards according to the embodiments of the present invention will be described in detail with reference to the accompanying drawings.

First, an optical connection board according to the first embodiment of the invention will be described with reference to FIGS. 3 and 4.

Figure 1:
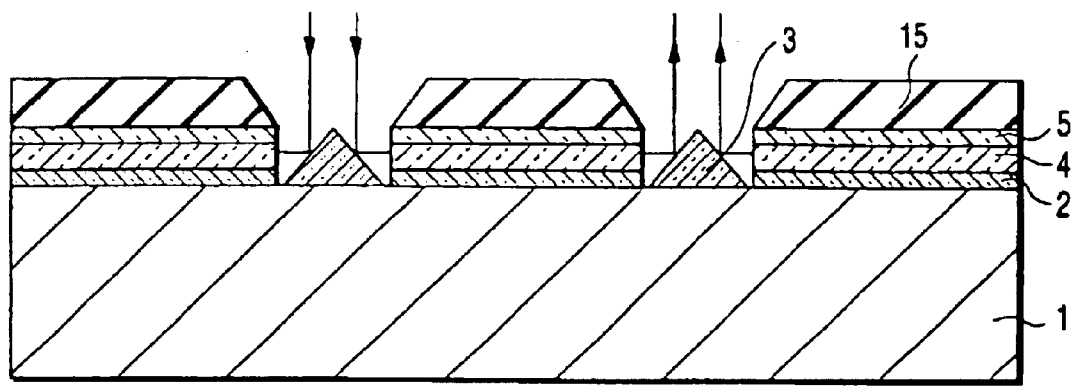
FIG. 1 is a sectional view schematically showing a conventional optical connection board.
Figure 2:
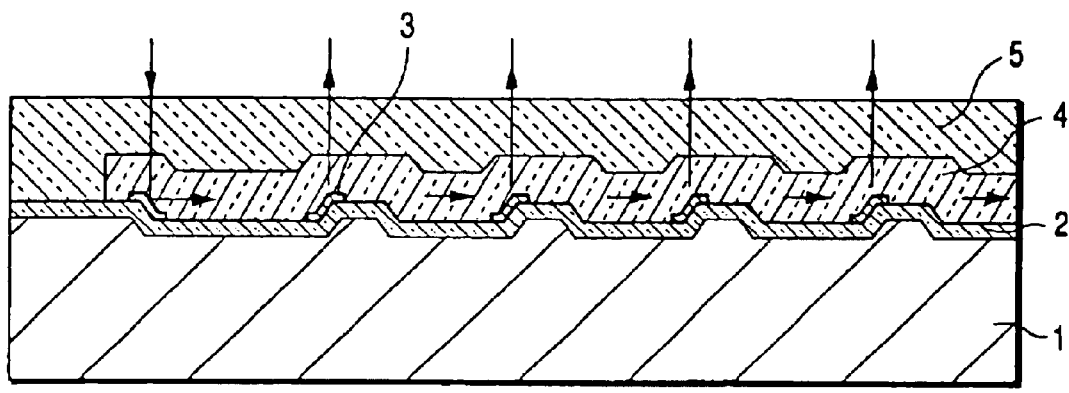
FIG. 2 is a sectional view schematically illustrating another conventional optical connection board.
Figure 3:
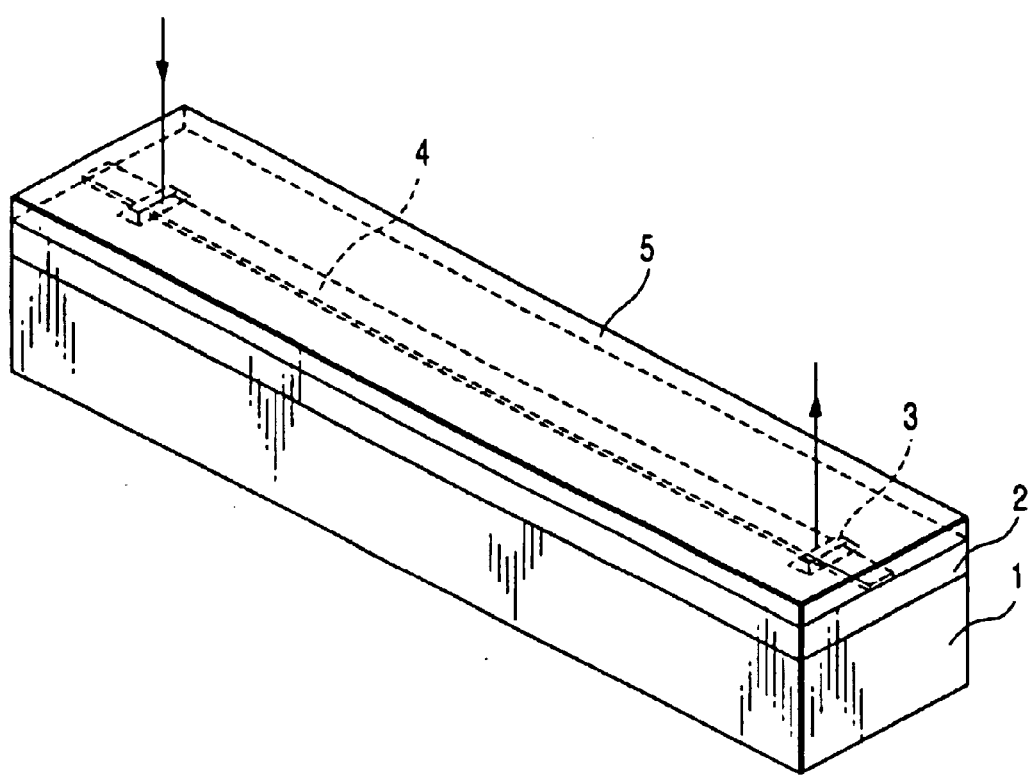
FIG. 3 is a perspective view schematically showing part of an optical connection board according to a first embodiment of the present invention.

AS FIG. 3 shows, the optical connection board comprises a substrate 1 having a flat surface, a lower clad layer 2 having a refractive index n2 and formed on the flat surface of the substrate 1, a termination mirror 3 formed on a flat surface of the lower clad layer 2, an optical waveguide core 4 having a refractive index n1 and formed on the flat surface of the lower clad layer 2, and an upper clad layer 5 having the refractive index n2 and formed on the flat surfaces of the optical waveguide core 4 and the termination mirror 3. The lower clad layer 2, or the first clad layer, is provided on the substrate 1, for confining a light wave or optical signal in the core 4. The termination mirror 3 is a hollow member having a reflection face. The mirror 3 may be filled with a refractive member or metal to form a reflector having a reflection face. The optical waveguide core 4, or an optical wave core layer, is provided to guide light wave or optical signal. The upper clad layer 5, or second clad layer, is provided for confining the light wave or optical signal in the waveguide core 4. The upper clad layer 5 is indicated by broken lines in FIG. 3. In FIG. 3, the arrow indicates the direction in which light wave or an optical signal is propagated.

Figure 4:
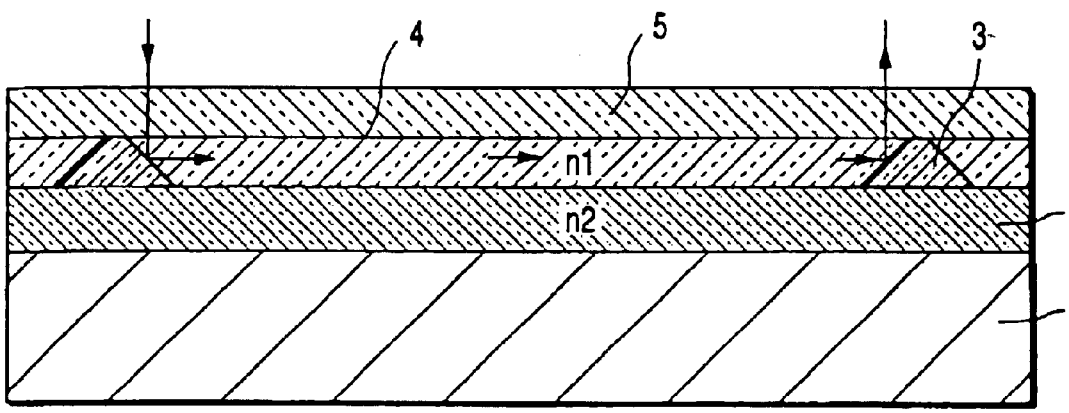
FIG. 4 is a sectional view, taken along the axis of the optical waveguide core shown in FIG. 3.

FIG. 4 shows a cross section of the optical connection board of FIG. 3, taken along the axis of the optical waveguide core 4. In FIG. 4, the reference numerals identical to those used in FIG. 3 designate the same components. The termination mirror 3 is located in the optical waveguide core 4 at the same level as the optical waveguide core 4 and is so extended in a lateral direction of the optical waveguide core 4 to cross the optical waveguide core 4. The mirror 3 has a reflection face inclined at about 45° to the direction in which the optical wave or signal is propagated in the optical waveguide, i.e., the flat surface of the clad layer 2. Therefore, the optical signal is reflected upward by 90° from the inclined reflection face of the termination mirror 3.

The substrate 1 may be made of any material, as long as it can serve to provide an optical connection board. It can be made of, for example, silicon, ceramic, glass-reinforced epoxy resin, or the like. The clad layers 2 and 5 and the optical waveguide core 4 may be made of, for example, glass-based material having its refractive index adjusted by adding impurity to quartz ($SiO_2$) or multi-component glass. Alternatively, the layers 2 and 5 may be made of polymer such as polyimide fluoride, acryl, or epoxy. The refractive index n1 of the optical waveguide core 4 is set higher than, and has a specific ratio to, the refractive index n2 of the clad layers 2 and 5. The optical waveguide core 4 has, for example, the height of 5 μm and width of 20 μm.

The termination mirror 3 is formed by one of two alternative methods. In the first method, material capable of reflecting optical signal is buried in the optical waveguide core 4. The material may be metal to be formed into a mirror or a low-refractive material to be formed into an optical prism at which the optical signal having an incident angle of 45° is totally reflected. In the second method, a spacer is embedded in the optical waveguide core 4 and removed therefrom, making a cavity in the optical waveguide core 4 so as to form an interface surface between the cavity and the waveguide core 4. The cavity may be filled with the air or other gas, preferably, an inert gas such as He, Ne, Ar or N gas. The termination mirror 3 has a height of vertex of 5 μm and a width of 30 μm as measured in the direction the mirror 3 extends across the core 4 that has the dimensions specified above.

The optical connection board shown in FIG. 4 is one optical input and one optical output type. That is, the termination mirror 3 located at one side of the optical connection board as shown in the left part of FIG. 4 functions as a coupler for light input side. An optical signal is applied at right angles to the surface of the optical connection board. The optical signal input to the terminal mirror is reflected in the optical wave core 4 from the reflection face of the termination mirror 3, i.e., the interface between the termination mirror 3 and the optical waveguide core 4. The reflected optical signal is propagated in the optical waveguide core 4 and guided into the other side of the termination mirror 3. It is then reflected from the reflection face of the other side termination mirror 3 and output from the optical connection board. Since the termination mirror 3 so extends as to across the optical waveguide core 4, most of the optical signal is incident on the reflection face at an incident angle falling within a numerical aperture of the optical waveguide core 4 so that the most of the optical signal is guided into the optical waveguide. In other words, most of the optical signals is optically coupled to the optical waveguide. Since the termination mirror 3 is buried in the optical waveguide core 4, it is easy for the upper clad layer 5 to have a flat surface. Moreover, the optical connection board can be formed to have a flat surface, because the board is not provide with the 45°-inclined cut faces, an external mirror, and the uneven surfaces or sides.

In the construction shown in FIGS. 3 and 4, there are provided core sections outside the optical coupling core section located between the termination mirrors 3. However, no optical signal can enter into the core sections, since the most of the input optical signal is reflected at 90° at the termination mirror of the optical waveguide. Thus, other optical coupling paths, which are continuous to the termination mirror 3, can be formed independent of the optical coupling core section located between the termination mirrors 3. No space for separating the optical coupling paths needs to be provided at the optical waveguide end portion, since the termination mirror 3 optically isolates the optical coupling paths from each other. High-density optical paths, or optical waveguides, can be formed on the optical connection board.

Figure 5:
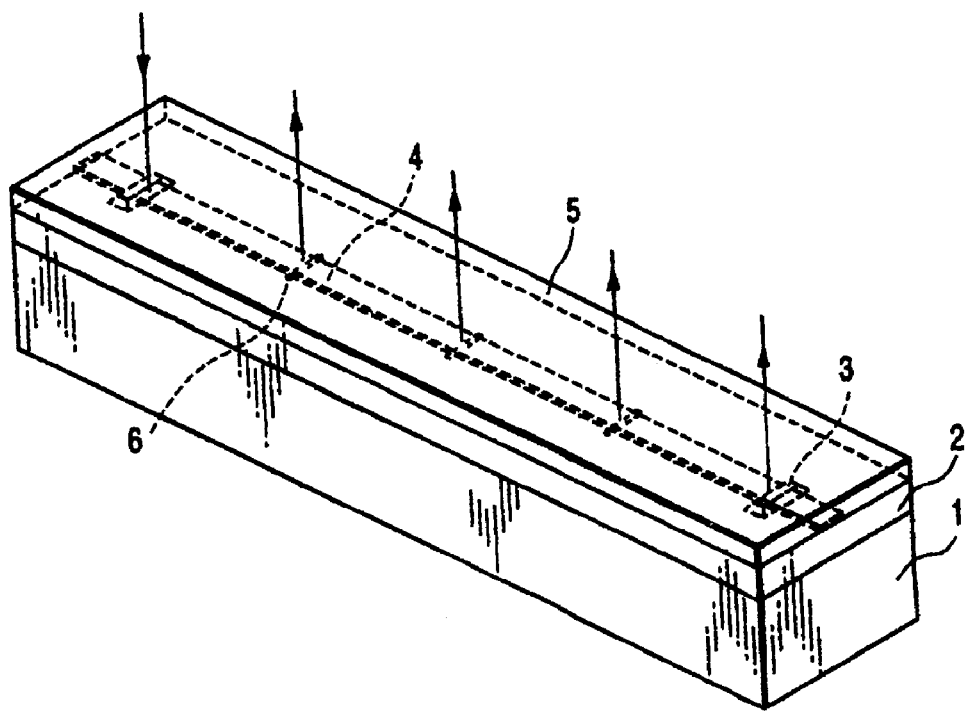
FIG. 5 is a perspective view schematically showing part of an optical connection board according to a second embodiment of the invention.
Figure 6:
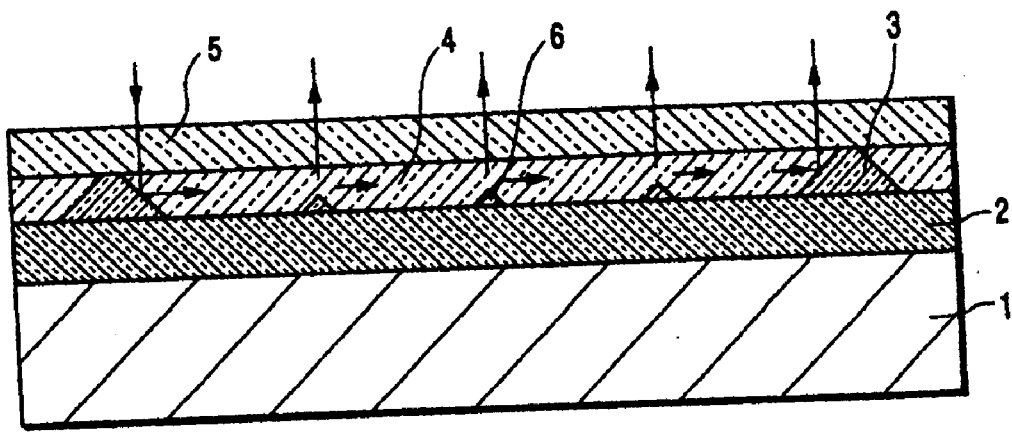
FIG. 6 is a sectional view, taken along the axis of the optical waveguide core shown in FIG. 5.

The optical connection board according to a second embodiment will be described with reference to FIGS. 5 and 6. FIG. 5 shows part of the optical interconnection circuit board. FIG. 6 is a sectional view, taken along the axis of the optical waveguide core 4. The component similar to those shown in FIGS. 3 and 4 are designated at the same reference numerals, and will not described in detail.

In the optical connection board of FIGS. 5 and 6, three mirrors 6 are provided between two termination mirrors 3, for splitting an input optical signal. Each split mirror 6 has a face inclined at about 45° to the signal-guiding direction of the optical waveguide, like the termination mirror 3. The mirrors 6 extend across the optical waveguide core 5. The mirrors 6 have a small height than the optical waveguide core 5, unlike the termination mirror 3. In other words, their height is smaller than the thickness of the core 5. Thus, a core region for guiding the optical signal is provided over the mirrors 6. As a result, a part of the guided wave is reflected upwards at 90°, while the remaining part of the wave passes through the core region and reaches the termination mirror 3. At the termination mirror 3, the optical signal is reflected upwards at 90°.

The components of the second embodiment are of same structure as those of the first embodiment. More precisely, each split mirror 6 has been made in one of two alternative methods. In the first method, material capable of reflecting optical signal is buried in the optical waveguide core 4. The material may be metal or a low-refractive material in which light applied at 45° is totally reflected. In the second method, a space is embedded in the optical waveguide core 4 and removed therefrom, making a cavity in the optical waveguide core 4. As in the first embodiment, the termination mirror 3 has a height of vertex of 5 μm and a width of 30 μm as measured in the direction in which the mirror 3 extends across the core 4. The split mirrors 6 have a height of vertex of 1.5 μm and a width of 30 μm as measured in a direction in which they extend across the core 4.

The optical connection board shown in FIGS. 5 and 6 is suitable for distributing a one-way signal such as a clock signal. The termination mirror 3 shown in the left part of FIG. 6 functions as an optical input coupler. An optical signal is applied at right angles to the surface of the connection board. Since the termination mirror 3 extends across the optical waveguide core 4, the optical signal is applied to the interface between the termination mirror 3 and the optical waveguide core 4, or the inclined face, at an angle that falls within the numerical aperture of the optical waveguide core 4. Most of the optical signal is therefore coupled to the optical waveguide.

The coupled optical signal travels through the optical waveguide. That part of the optical signal, which corresponds to a sectional area of the split mirror 6, is reflected upwards at 90° by the split mirror 6. The remaining part of the optical signal, not reflected by the first split mirror 6, further travels through the optical waveguide until it reaches the second mirror 6 or the termination mirror 3. In the second embodiment, 30% of the input optical signal is distributed by the first split mirror 6, 21% thereof by the second split mirror 6, 15% thereof by the third split mirror 6, and 34% thereof by the third split mirror 6.

An optical connection board according to the third embodiment of the invention will be described with reference to FIG. 7.

Figure 7:
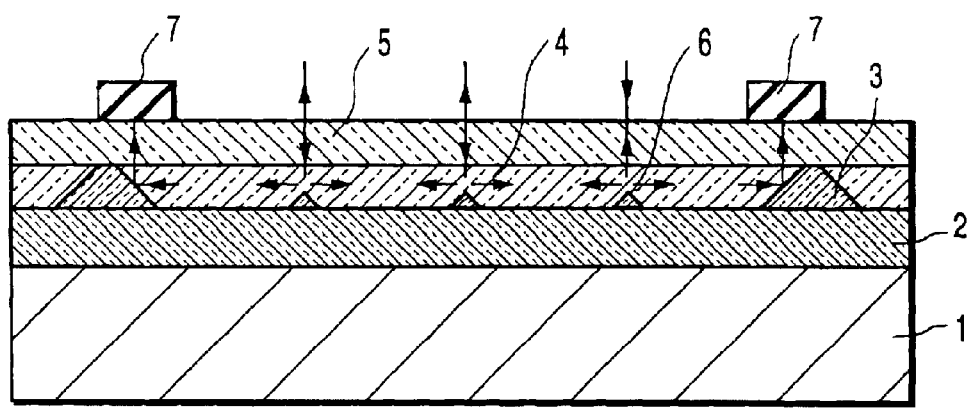
FIG. 7 is a perspective view schematically depicting part of an optical interconnection circuit board according to a third embodiment of the invention.

FIG. 7 is a sectional view showing part of the third embodiment of the present invention. The components identical to those shown in FIG. 6 are denoted at the same reference numerals will not be described in detail.

As shown in FIG. 7, the optical connection board comprises a light-absorbing segment 7 for absorbing unnecessary optical signal. The light-absorbing segment 7 is provided on the upper clad layer 5, to absorb optical signal reflected from the termination mirror 3. The other components are of the same structure as those of the first and second embodiments. The light-absorbing segment 7 may be formed by an appropriate material selected in accordance with the wavelength of the optical wave that may be applied to it. If the light applied to it has wavelength of 0.85 μm, the segment 7 may be made of semiconductors such as Si or Ge, or polymer containing carbon or dye.

In the optical interconnection circuit board shown in FIG. 7, each split mirror 6 functions as an optical tap. The optical connection board has an optical transmission terminal and operates as a distribution type optical bus. The first split mirror 6, shown in the right part of FIG. 7, transmits light, whereas the second and third split mirrors 6 output optical signals.

In the optical transmission terminal, the optical wave is applied to the vertex of the first split mirror 6, with its axis aligned with the vertex. The light beam is therefore distributed equally to the right and left parts of the first split mirror 6. The optical signal thus distributed enters the optical waveguide. A part of the optical signal, which is proportional to the cross-sectional area of the split mirror 6, is reflected upward at 90° from the second split mirror 6. The remaining part of the optical signal, not reflected from the second split mirror, further travels through the optical waveguide and is then reflected upward at 90° from the third split mirror 6. The remaining part of the optical signal reaches the termination mirror 3. If the remaining part of the optical signal is reflected back from the termination mirror 3, it will travel back to each split mirror 6. Consequently, this part of the signal is superimposed on the signal first received. This will cause a data error. To prevent such a data error, the optical signal reflected from the termination mirror 3 is applied to the light-absorbing segment 7. The segment 7 absorbs the optical signal, preventing the signal from traveling back to any split mirror 6. As a result, no optical signals are superimposed one upon another at the split mirrors 6.

The light transmission terminal is not limited to the split mirror 6 shown in the right part of FIG. 7. Rather, each split mirrors 6 can transmit and receive light. The light-transmitting function and the light-receiving function of each mirror 6 can be dynamically switched, from one to the other. In the structure shown in FIG. 7, the optical absorbing segments 7, provided on both sides, absorb optical signals. The segments 7 may be replaced by photosensitive elements for monitoring the optical signal, which function as optical bus monitors.

In the light transmission terminal, the axis of the optical wave is aligned with the vertex of the split mirror 6. Nevertheless, the axis of the beam may be deviated from the vertex of the mirror 6, thus changing the light-distributing ratio between the right part and left part of the mirror 6. For example, in the optical signal propagation shown in FIG. 7, only the termination mirror (i.e., the optical termination terminal or the optical bus monitor) is provided on the right side. Instead, two split mirrors 6 are arranged on the left side, thereby to apply more light to the left side than to the right side. In this case, it is desirable to locate the axis of the optical wave on the left side to the vertex of the split mirror. Where the axis of the optical wave should be positioned depends upon the structure of the optical connection board.

A method of manufacturing the optical connection board shown in FIG. 7, which is the fourth embodiment of the invention, will be described with reference to FIGS. 8A to 8F. The board is a multi-chip optical connection module (MCM), in which a polymer-based optical waveguide is formed on the Si substrate.

Figure 8A:
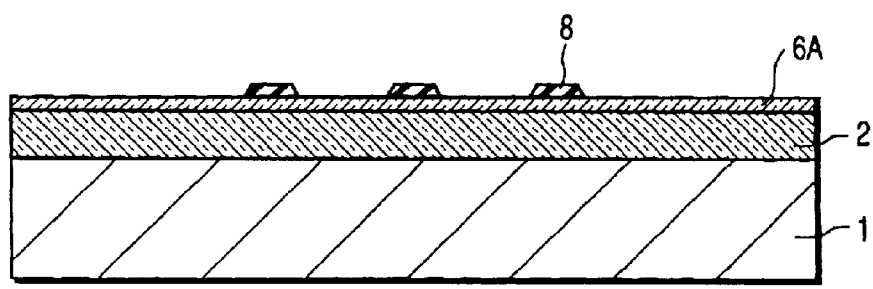
FIGS. 8A to 8F are sectional views explaining a method of manufacturing an optical connection board according to a fourth embodiment of the present invention.

As shown in FIG. 8A, a lower clad layer 2 is formed on the entire surface of the Si substrate 1. A layer 6A, which will be processed into split mirrors, is formed on the lower clad layer 2. A photoresist 8 is formed on the layer 6A and is patterned. Note that the lower clad layer 2 is made of, for example, low-refractive polyimide fluoride. It has been formed to a thickness of 50 $\mu$m, by means of spin coating, spray coating, dispenser coating or the like, and by cured with heat. The layer 6A has been formed by sputtering, vapor deposition or the like. It is made of copper and is 1.5 $\mu$m thick.

The photoresist 8 is several times as thick as the layer 6A. For example, it is 3 $\mu$m thick, that is, twice as thick as the layer 6A. If the split mirrors 6 are 1.5 $\mu$m in height and 30 $\mu$m in width, the optical waveguide will have a width of 3 $\mu$m, as measured in the light-guiding direction. The patterned photoresist 8 is a rectangular layer having the size of 6 $\mu$m×33 $\mu$m. This reason why will be described later.

Figure 8B:
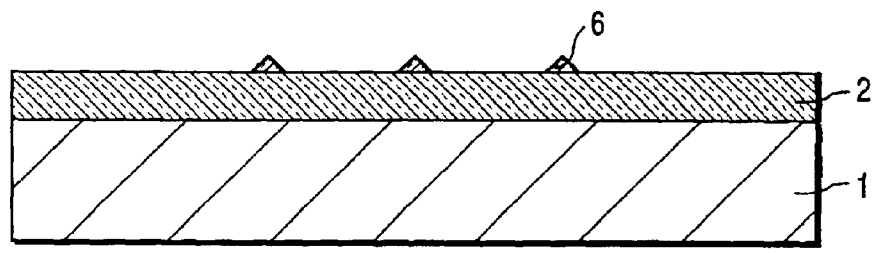

Next, as shown in FIG. 8B, the split mirrors 6 are by etching the photoresist 8.

Figure 8C:
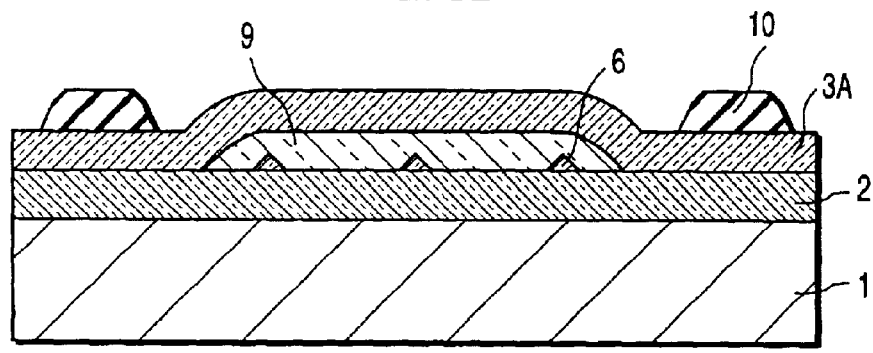

Next, as shown in FIG. 8C, a photoresist 9 is formed on the lower clad layer 2, covering and protecting the split mirrors 6. Then, a layer 3A is formed on the entire surface of the resultant structure, by means of sputtering, vapor deposition or the like, covering the lower clad layer 2 and the photoresist 9. The layer 3A is made of, for example, copper and is 5 $\mu$m thick. As compared to the final pattern width of the termination mirror 3, a photoresist 10 is formed on the layer 3A and patterned. The patterned photoresist 10 is several times as thick as the layer 3A. For example, it is 10 $\mu$m thick, that is, twice as thick as the layer 3A. If the split mirror 6 is 5 $\mu$m in height and 30 $\mu$m in width, the optical waveguide will have a width of 10 $\mu$m, as measured in the light-guiding direction. Therefore, the patterned photoresist 10 is a rectangular layer having the size 20 $\mu$m×40 $\mu$m. This reason why will be described later.

Figure 8D:
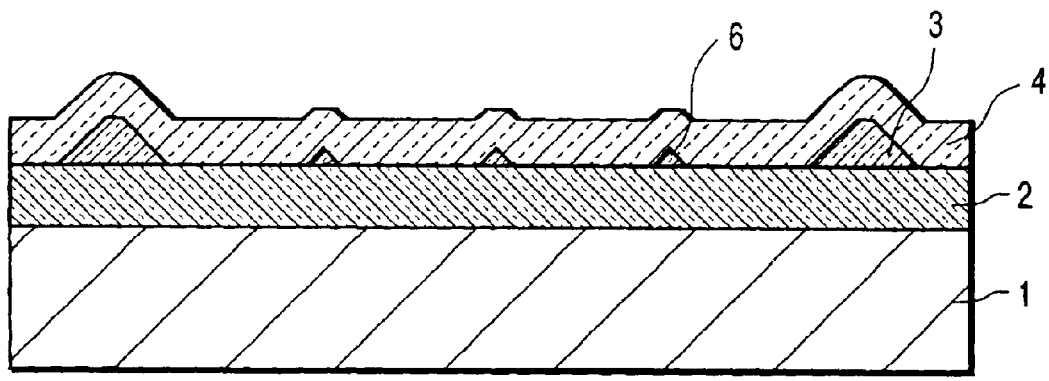

Then, as shown in FIG. 8D, the termination mirrors 3, each having an apex angle of 45°, are formed by etching the photoresist 10 and removing the photoresist 9. Further, the optical waveguide core 4 is formed on the entire surface of the lower clad layer 2 by spin coating, spray coating, dispenser coating or the like. The core 4 is made of, for example, high-refractive polyimide fluoride and is 5 $\mu$m thick. The optical waveguide core 4 is cured with heat. At this time, the core 4 covers the split mirrors 6 and the termination mirrors 3 and bulges up at the parts that lie on the mirrors 3 and 6. The upper surface of the core 4 is rendered flat by means of grinding, dummy resist coating, dry etching or the like. As a result, the vertexes of the termination mirrors 3 are exposed. The optical waveguide core 4 is patterned to have a desired width of, for example, 20 $\mu$m. The patterning is accomplished by dry etching using photoresist, that is, by removing the unnecessary parts. Alternatively, the core 4 is patterned by refractive shifting, in which the core layer is irradiating with light.

Figure 8E:
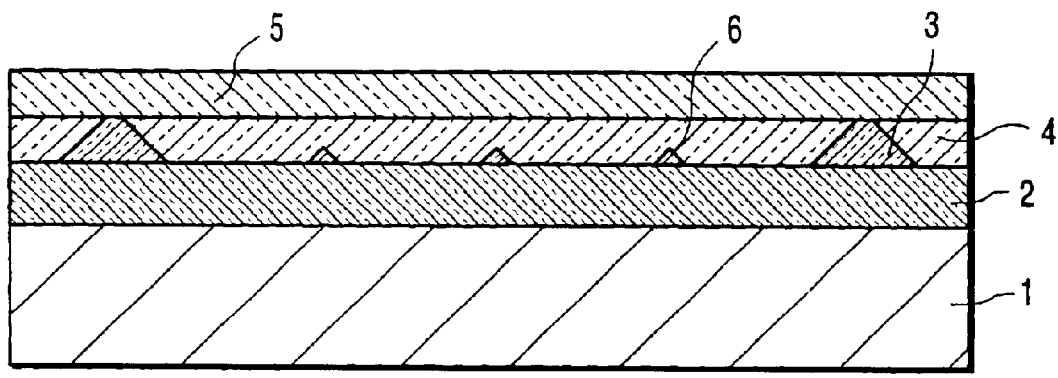

As shown in FIG. 8E, the optical waveguide core 5 is formed by spin coating, spray coating, dispenser coating or the like and then by thermal curing. The core 5 covers the termination mirrors 3 and the optical waveguide core 4. The optical waveguide core 5 is made of, for example, low-refractive polyimide fluoride and is, for example, 20 $\mu$m thick. When the optical waveguide core 4 is patterned by removing unnecessary parts, a step may be formed between each part of the core 5, which lies on a termination mirror 3 and the adjacent part of the core 5, which does not lie on the mirror 3. To eliminate such a step, two methods can be used. In the first method, a dummy optical waveguide core is left, which does not lie on the optical coupling section. In the second method, the optical waveguide core 5 is formed thick and ground to a desired thickness to have a flat upper surface.

Figure 8F:
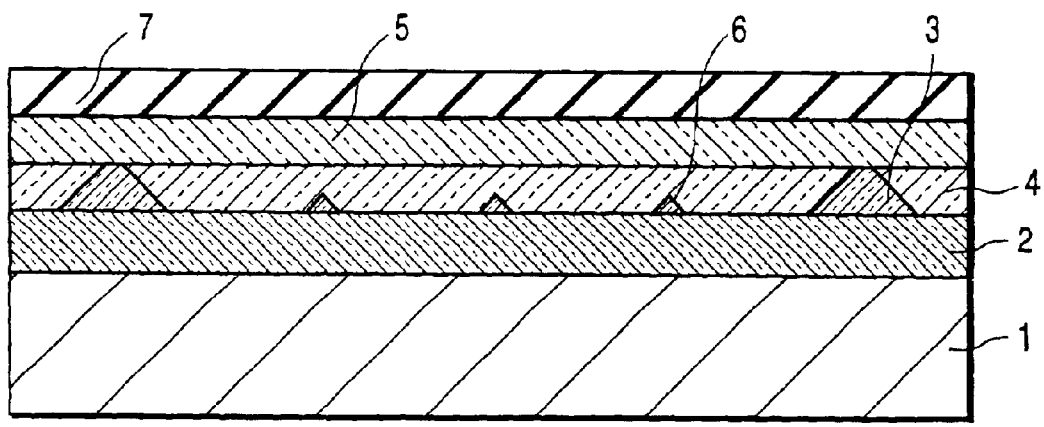

As shown in FIG. 8F, a layer 7 is formed on the entire surface of the optical waveguide core 5. The layer 7 is made of, for example, Ge and is 5 $\mu$m thick. It has been formed first by sputtering, vapor deposition or the like. A photoresist (not shown) is formed on the layer 7 and pattered. Using the patterned photoresist as mask, selective etching is performed on the layer 7, thereby forming the light absorbing segments 7 that lie above the termination mirrors 3 as is illustrated in FIG. 7. Alternatively, the light absorbing segments 7 may be formed on the optical waveguide core 5 by means of selective deposition using lift-off technique or a metal mask. The structure shown in FIG. 7 is thus obtained.

The method described above has no step of mechanically grinding for forming mirrors having an apex angle of 45°. Nor does it have a step of mounting external components. Hence, the method can utilize ordinary multi-layer forming technique, i.e., mass production of printed circuit boards and semiconductor devices. The optical connection board according to the invention can therefore be manufacturing at low cost.

How to provide mirrors having an apex angle of 45° will be described in detail, with reference to FIGS. 9A and 9B, which are sectional views explaining the step of forming the termination mirrors 3.

Figure 9A:
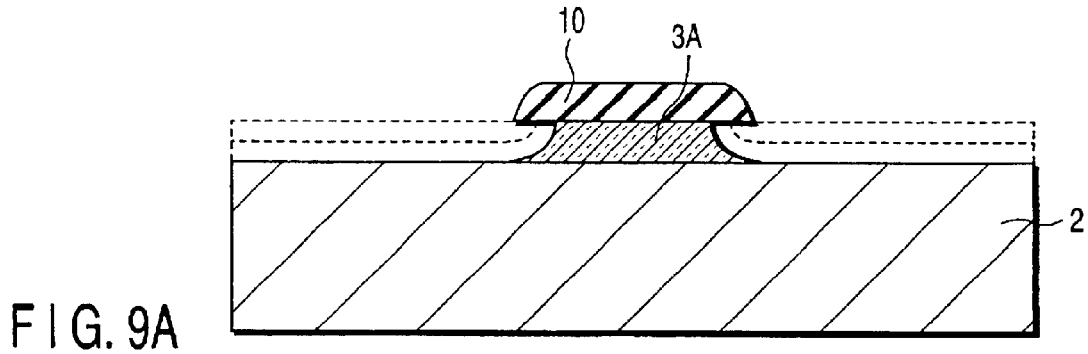
FIGS. 9A and 9B are sectional views, explaining a method of manufacturing the mirror portion provided on the optical connection board illustrated in FIG. 7.

As shown in FIG. 9A, the layer 3A is formed on the lower clad layer 2. The photoresist 10 is formed on the layer 3A and is patterned such that the layer 3A will be processed into mirrors 3, each having an apex angle 45°. The layer 3A may be made of copper, gold, silver, aluminum or the like, the optical connection board is one to receive input light signals are near-infrared rays or infrared rays, having a wavelength ranging, for example from 0.85 µm to 1.3 µm. The layer 3A has been formed by sputtering, vapor deposition or the like and is, for example, 5 µm thick.

Further, the photoresist 10 is several times as thick as the layer 3A, for example twice. For example, it is twice as thick, or 10 µm thick. If the split mirrors are 5 µm in height and 30 µm in width, the optical waveguide will have a width of 10 µm, as measured in the light-guiding direction. Therefore, the patterned photoresist 10 is a rectangular layer having the size of 20 µm×40 µm.

Figure 9B:
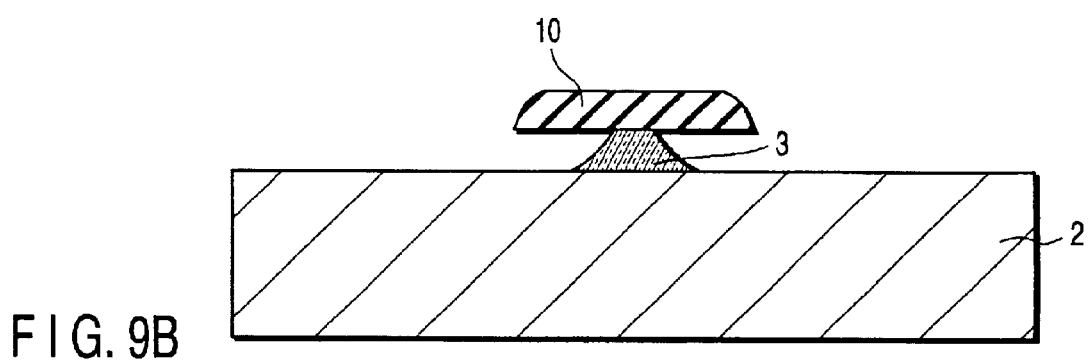

As shown in FIG. 9B, the layer 3A is subjected to wet etching or dry etching and any method, in accordance with the other etching conditions. In the present instance, the wet etching is carried out as will be described.

The layer 3A may be made of copper. In this case, the etching solution used is ferric chloride solution, cupric chloride solution, solution of sulfuric acid and hydrogen peroxide, or diluted hydrochloric acid. If the layer 3A is made of gold, the etching solution is aqua regia (i.e., solution of chloride acid and sulfuric acid), solution of iodine, potassium iodide and potassium hydroxide, or solution of chloride acid and hydrogen peroxide. If the layer 3A is made of silver, the etching solution is diluted sulfuric acid or solution of ammonia and hydrogen peroxide. If the layer 3A is made of aluminum, the etching solution is sodium hydroxide solution or solution of phosphoric acid, sulfuric acid and acetic acid. Thus, the etching solution is selected from many, in accordance with material of the layer 3A.

Generally, metal layers are etched by so-called "isotropic etching." The isotropic proceeds along an arc at the ends of the photoresist as indicated by the broken lines shown in FIG. 9A. Usually, the etching terminates in the condition shown in FIG. 9A. Nonetheless, the etching further goes on, forming a slope of almost 45° in the layer 3A. As a result, that part of the 3A which lie under the resist is etched, forming a so-called "under-cut." If the photoresist is tick and strong, its ends tend to become almost vertical, due to the under-cut.

Conversely, if the photoresist is thin, it is likely to peel off as the etching proceeds. In this case, the end of the under-cut will gently incline. It is therefore possible to form an under-cut that inclines at about 45°, provided that the photoresist is a desirable type and has as thick as is desired and the heating condition is appropriate as is illustrated in FIG. 9B. This is the very reason why the patterned photoresist should be several times as thick as the layer 3A. If the photoresist is so thick, it is possible to prevent the etched pattern from being reduced.

If this under-cut etching progresses further, the contact portion ceases to exist between the photoresist and the layer 3A. In this case, the photoresist peels off. No problems will arise if the etching is stopped immediately in this condition. However, it is generally impossible for the photoresist to peel off in its entirety at one time, because of the uneven surface of the substrate. Thus, the etching should therefore be stopped at the time the contact portion between the photoresist and the layer 3A still remains to some extent. For example, it may be stopped at such timing that the contact portion remains at the thickness of about 1 µm. If the etching velocity is relatively low, for example, less than 0.5 µm per minute, thereby to stop the etching stop at a desired timing, the manufacturing process will be controlled easily.

To form a slope on the etching end by the under-cut, with high reproducibility, it is effective to insert, prior to etching, a thin layer of a material having a faster etching rate than the mirror material, into the gap between the photoresist and the layer 3A. If the layer 3A is made of aluminum, if its surface is oxidized by anodic oxidation and if the mixing solution is a mixture of phosphoric acid, acetic acid, sulfuric acid, water and ammonium fluoride (volume ratio: 76:15:3:5:1), the anodic oxidized film is etched faster than aluminum. In this case, a slope can be formed at the etching end without peeling off the resist material.

A method of manufacturing the optical connection board according to a fifth embodiment of the invention will be described with reference to FIGS. 10A and 10B.

Figure 10A:
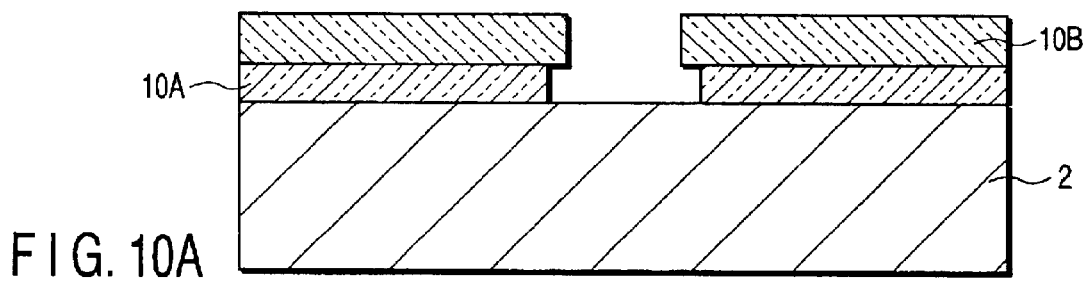
FIGS. 10A and 10B are sectional views, explaining a method of manufacturing the mirror portion in the fifth embodiment of the present invention.
Figure 10B:
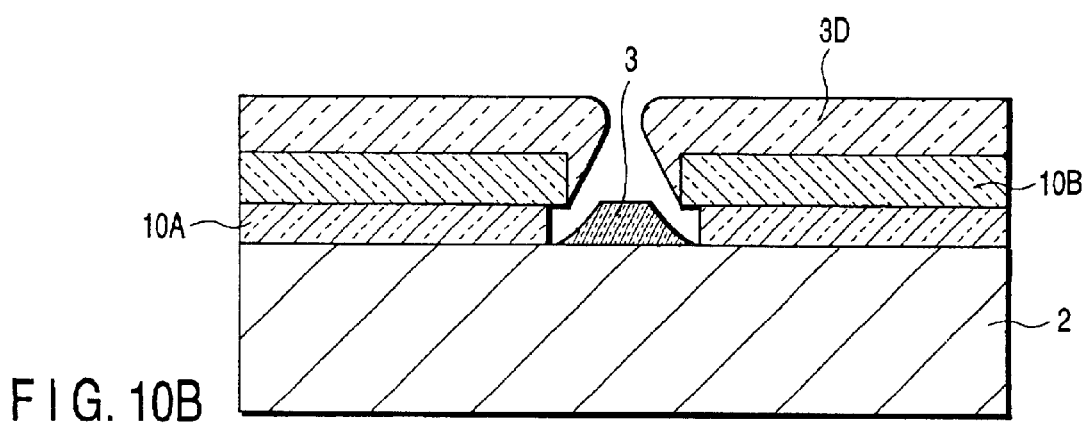

FIGS. 10A and 10B are sectional views, explaining this method, particularly the step of forming a mirror having an apex angle of 45°.

In this method, the mirror material is not formed on an entire surface. Rather, the mirror is formed by depositing the mirror material on a selected part of the surface. FIG. 10A shows two masks 10A and 10B that are laid, one upon the other, on the lower clad layer 2. The mask 10A and 10B have been formed by processing a multi-layer resist or by laying metal masks on photoresist. The multi-layer resist method, which can provide masks of high precision, will be described.

In FIG. 10A, reference numeral 10A denotes a lower resist and reference numeral 10B denotes an upper resist. The resists 10A and 10B have been formed by repeating the step of forming a resist twice. As shown in FIG. 10A, the lower resist recedes, relative to the upper resist, defining a larger space than the upper resist. Further, if the photoresist used is a negative type one, a so-called "inverse taper" may be formed. In this case, the pattern spreads toward the lower clad layer 2 from the surface of the photoresist by applying a relatively small amount of light to the photoresist during the exposure process. Further, the lower resist 10A and the upper resist 10B may be of different materials. If this is the case, it is possible to utilize the difference in development characteristic, which is attained when the resists 10A and 10B are exposed and developed all at once.

Next, in the condition of FIG. 10A, a layer is deposited by sputtering, vapor deposition or the like. Generally, a layer deposited by sputtering, vapor deposition or the like bulges at either end of the photoresist as is illustrated by 3D in FIG. 10B. This is because more material is deposited on the upper part of either sidewall of the layer 10B than on the lower part thereof, even after the layer is formed. As a result of such a gradual growth on the sidewall, a slope is formed on either end of the photoresist.

In this embodiment, it is unnecessary to leave a flat surface on the vertex of the mirror 3, unlike in the embodiment shown in FIG. 9. That is, the process of FIG. 10B is not stopped, and the deposition of the layer 3A is continued until the right and left sidewalls grow to touch each other. Thus, the flat surface no longer exists on the vertex. If the split mirror 6 is formed in this manner, the vertex has no flat surface. Hence, no part of the incident optical signal would no be reflected back, inevitably generating a loss of energy.

The two layers of the photoresist are used, with the lower one receding relative to the upper one, in order to prevent the mirror 3, which has the slope and the mirror material 3A that is deposited on the photoresist, from contacting each other. The two layers are used for another objective, to prevent the slope surface of the mirror 3 from being roughed by such a contact. In this embodiment, the slope angle of the mirror 3 can be adjusted by changing a deposition speed of the mirror material and/or by rotating the substrate inclined at an adjusted angle during sputtering or vapor deposition.

Further, an optical connection board according to the sixth embodiment of the invention will be described with reference to FIG. 11.

Figure 11:
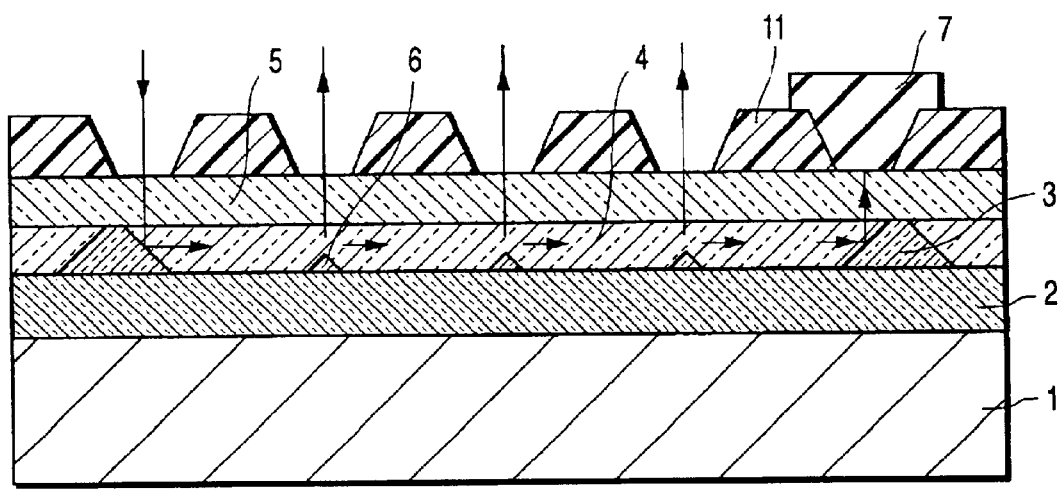
FIG. 11 is a perspective view schematically showing part of an optical connection board according to a sixth embodiment of this invention.

FIG. 11 is a sectional view showing part of the optical connection board according to the fifth embodiment. The components identical to those shown in FIG. 6 are designated at the same reference numerals and will not be described in detail.

As shown in FIG. 11, the optical connection board has a cover layer for guiding the optical terminal. The cover layer 11 is formed by applying polyimide or the like onto the upper clad layer 5 of the structure shown in FIG. 6 and by moving the optical input/output parts of the polyimide layer. A concave made in the optical input/output portion has a function of mechanically guiding an optical terminal of a component mounted on the optical connection board.

Figure 12:
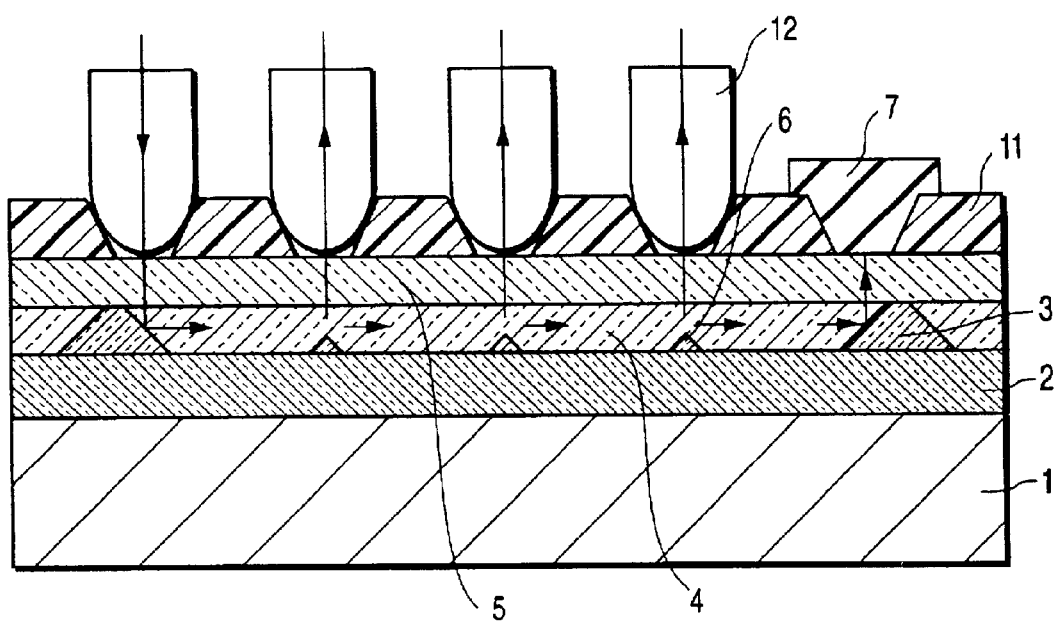
FIG. 12 is a sectional view schematically showing the sixth embodiment, with optical rods connected to it.

The optical terminal of the component is an optical road 12 having, for example, a spherically tapered end. The optical rod 12 is inserted into the concave made in the cover layer 11, as is illustrated in FIG. 12. This renders it unnecessary to align the optical axis of the optical terminal of the mounted component with the optical axis of the optical connection board. The time required to mount the component on the optical connection board can therefore be much shortened.

An optical connection board according to the seventh embodiment of the present invention will be described with reference to FIGS. 13 and 14.

Figure 13:
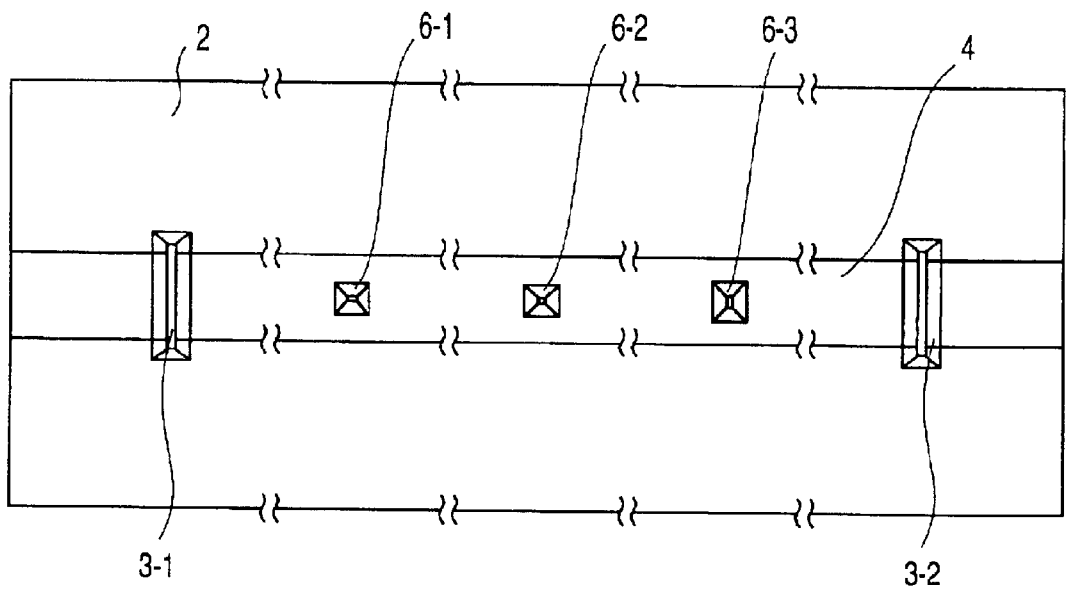
FIG. 13 is a top view schematically showing part of an optical connection board according to a seventh embodiment of the invention.
Figure 14:
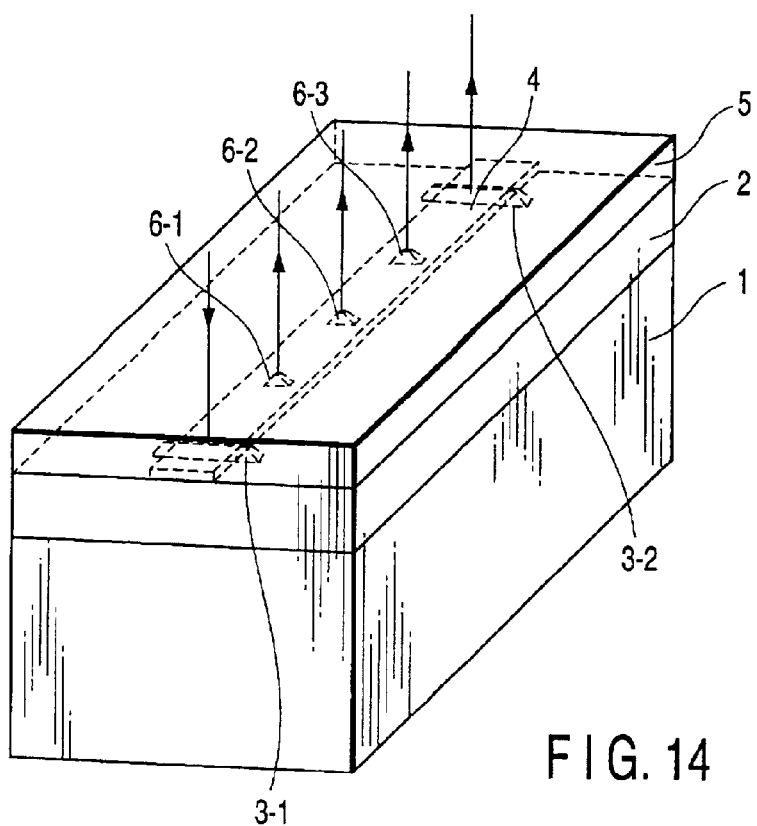
FIG. 14 is a perspective view schematically depicting part of the optical connection board shown in FIG. 13.

FIGS. 13 and 14 are a top view and a perspective view, respectively, showing part of the optical interconnection circuit board. The components identical those shown in FIG. 6 are designated at the same reference numerals and will not be described in detail.

The board of FIGS. 13 and 14 is configured to achieve one-way optical connection for distributing clock signals. The split mirrors 6-1, 6-2 and 6-3 have different widths, measured in the direction they traverse the core 4. The optical signal input to the termination mirror 3-1 can therefore distributed to the split mirrors 6-1, 6-2 and 6-3 and the termination mirror 3-2. As in FIGS. 13 and 14, the optical signal is distributed to the four optical input/output components, including the termination mirror, and each of these mirrors outputs 25% of the input optical signal. In this case, the signal-splitting ratios of the split mirror 6-1, 6-2 and 6-3 are 25%, about 33% and 50%. Then, the split mirrors 6-1, 6-2 and 6-3 needs to have a smaller width than the termination mirror 3-2.

Assume that the optical waveguide is 5 $\mu$m in thickness and 30 $\mu$m in width and that the termination mirrors 3-1 and 3-2 are 5 $\mu$m in height and 40 $\mu$m in width. The split mirrors 6-1, 6-2, 6-3 are need to be formed at the aforementioned ratio in terms of vertical sectional area, with respect to the waveguide core, thereby to provide the termination mirrors. Assume that the angle of each slope is 45°, the optical split ratio $\eta$ is given as $\eta=(W+t)/W0$, where W is the width of the vertex, t is the height thereof is t, and W0 is the width of the optical waveguide core 4. That is, if the split mirrors 6-1, 6-2 and 6-3 have vertex widths of 2.5 $\mu$m, 4.9 $\mu$m and 10 $\mu$m, respectively, the aforementioned ratio is obtained. Since the vertex and corner of the side face of the termination mirror are rather rounded, however, the pattern width must be corrected in terms of effective sectional area.

Further, an optical connection board according to the seventh embodiment of the invention will be described with reference to FIG. 11.

Figure 15:
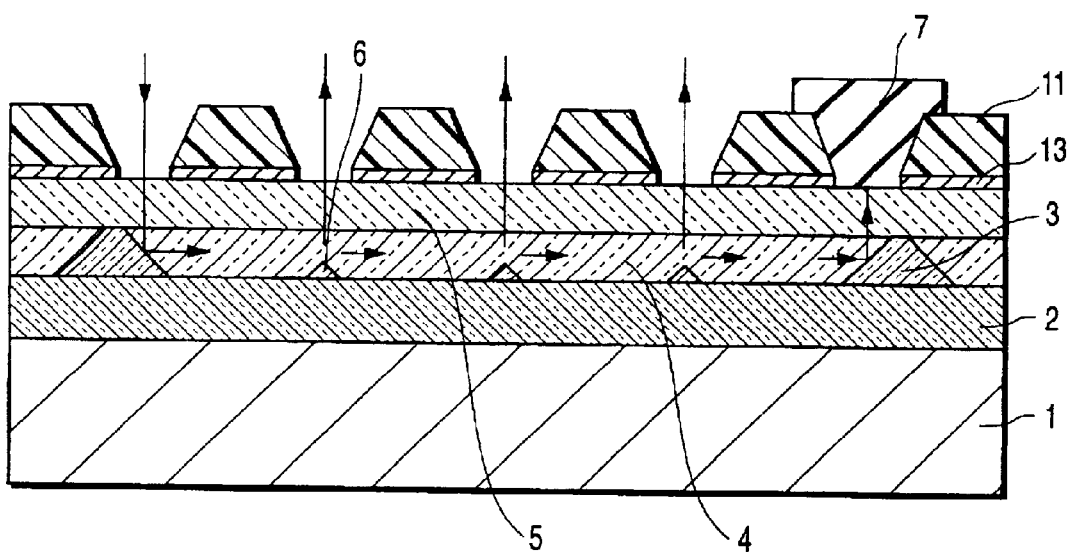
FIG. 15 is a sectional view schematically showing part of the optical connection board according to an eighth embodiment of this invention.

FIG. 15 is a sectional view showing part of this optical connection board. The components identical to those shown in FIG. 11 are denoted at the same reference numerals and will not be described in detail.

The board shown of FIG. 15 has a shield 13 provided on the upper surface of the upper clad layer 5. The shield is configured to prevent stray light rays, or an optical noise, from entering the optical connection board or other optical input/output terminal. No allowance therefore needs to be given to the power of the optical signal, which is determined by external light to achieve appropriate distribution of the optical signal within the optical connection board. The operating power of the board can therefore be reduced than otherwise, and the board consumes less power than otherwise. Note that the shield 13 may be formed of the same material as the mirrors 3 and 6 or the same material (absorbing film) as the absorbing segment 7.

A method of manufacturing the optical connection board of FIG. 15, which is the eighth embodiment, will be described with reference to FIGS. 16A to 16C that are sectional views.

As shown in FIG. 16A, a light shield 13 is formed on the entire surface of the structure shown in FIG. 8E. A cover layer 11 is then formed on the light shield 13 as shown in FIG. 16B. A photoresist 14 is formed on the cover layer 11. The photoresist 14 is patterned. Using the patterned photoresist 14 as mask, the cover layer 11 is patterned by selective etching. As shown in FIG. 16C, the photoresist 14 is removed. Using the cover layer 11 thus patterned, as mask, the shield 13 is patterned by selectively etching. The structure of FIG. 15 is thus produced. In this method, the light input/output portions are formed and self-aligned, in the cover layer 11 and the light shield 13 based on the photoresist 14.

In the method described with reference to FIGS. 16A to 16C, the light shield 13 is used as etching stopper, whereby the openings made in the cover layer 11 can have a desired depth and can be accurately aligned with the openings made in the light shield 13. Further, the light input/output portion can remain as flat as when the case the upper clad layer 5 is formed. Thus, the board shown in FIG. 15 can be produced efficiently.

An optical connection board according to the eighth embodiment of this invention will be described with reference to FIGS. 17 and 18.

Figure 17:
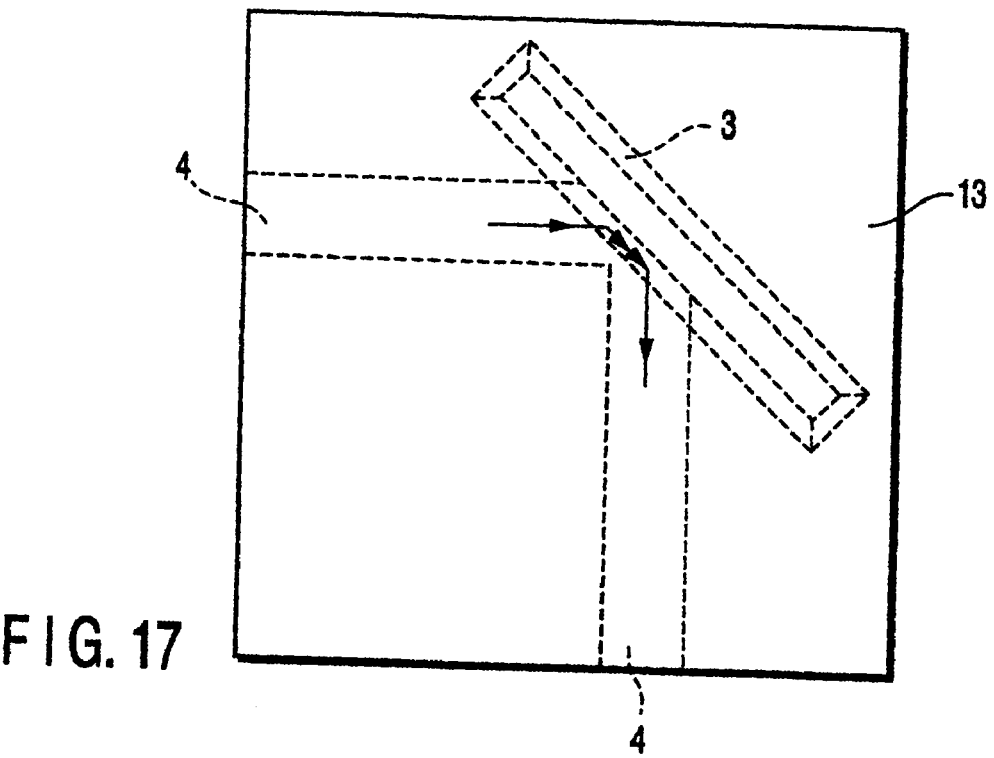
FIG. 17 is a top view of a part of an optical connection board according to a tenth embodiment of the invention.
Figure 18:
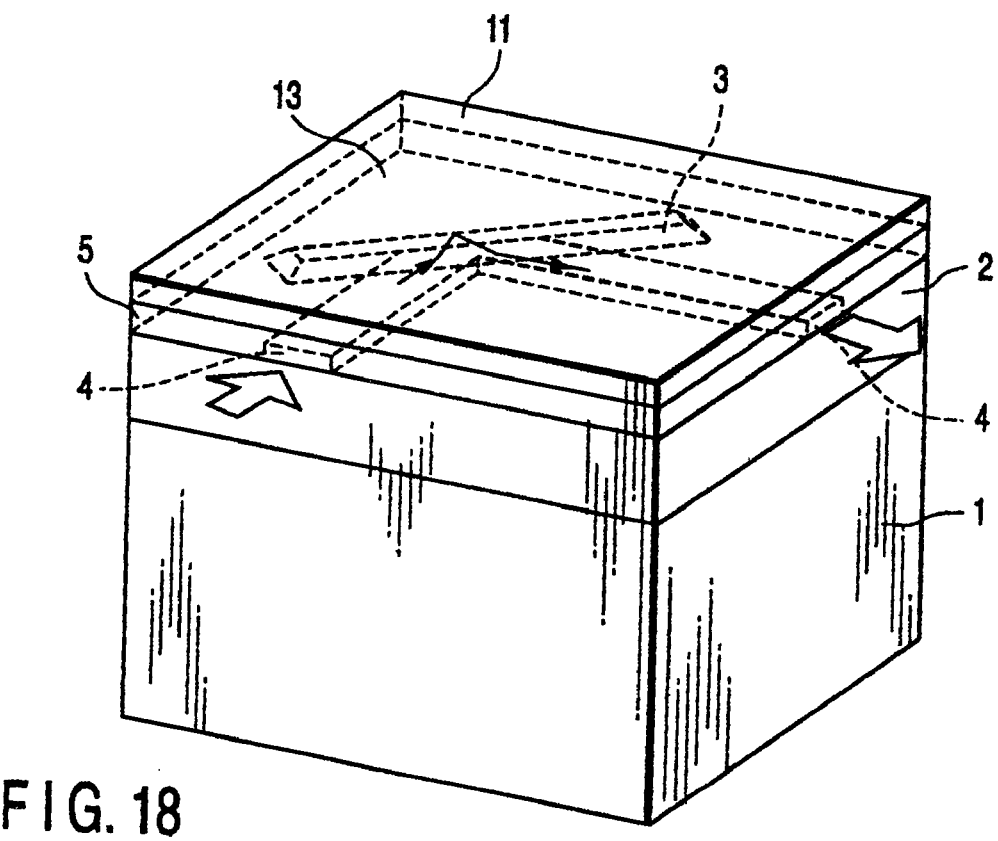
FIG. 18 is a perspective view of a part of an optical connection board according to a tenth embodiment of the present invention.

FIGS. 17 and 18 are a top view and a perspective view, respectively, illustrating part of the optical connection board in order to explain a tenth embodiment of the present invention. In the circuit board shown in FIGS. 17 and 18, the termination mirror 3 is not a 90° transformation mirror for outputting the optical signal upward but bending the optical signal at 90° within a horizontal plane.

The structure shown in FIGS. 17 and 18 is similar to the optical connection board of FIG. 15. Unlike the board of FIG. 15, it has a light shield 13 that is used as a reflection mirror. In this structure, the light shield 13 functions as a reflection film and the aforementioned mirror material is applied. The termination mirror 3 is inclined at 45° to the direction in which the optical wave travels through the optical waveguide, i.e., to the flat surface of the clad layer 2.

In the optical connection board shown in FIGS. 17 and 18, the optical signal from the mirror 3 is reflected from reflection film 13 and redirected the optical signal to the mirror 3 from reflection film 13 through the clad layer 5, and then the redirected optical signal is reflected from the mirror 3 to the core 4, as shown in FIGS. 17 and 18.

As described above, the optical signal is reflected repeatedly by the reflection film 13, it travels along the reflection face of the termination mirror 3, is shifted in accordance with the distance between the reflection face of the termination mirror 3 and the reflection film 13, and then returns to the reflection face of the termination mirror 3, as is illustrated in FIG. 18. The optical signal reflected from the termination mirror 3 is output at 90° in the horizontal plane and introduced into the optical waveguide core 4. Thus, the optical waveguide is bent at 90°.

If the face of the core 4, which receives the optical signal reflected by the reflection film 13, is inclined at 45° to the opposite direction, the signal travels in the same direction as it was input to the optical connection board. Then, an output exactly the same as the guided optical signal is moved in parallel, as if shifted by a beam shifter. The termination mirror 3 may be replaced by a split mirror 6 which is thinner than the optical waveguide core 4. If this is the case, it is possible to provide a split device for splitting the optical signal into two beams, which extend at 90° to which other or parallel to each other in the horizontal plane.

In the optical connection board shown in FIGS. 3 to 6 and FIGS. 13 to 15, each of the termination mirror 3 and the split mirror 6, 6-1 to 6-3 have the mirror face inclined at substantially 45° to the flat surface of the clad 2. In this configuration, it is preferable to provide an anti-reflection coating on the surface of the clad layer 5 to prevent a part of the optical signal from being reflected from the surface of the clad layer 5. The clad layer 5 may also have an inclined segment region on the surface thereof, on which the optical signal is incident from the segment mirror, instead of the anti-reflection coating. If the optical signal reflected from the mirror segment is incident on the clad surface at substantially 90°, a part of the optical signal is reflected from clad surface and redirected to the mirror as an optical noise. However, if the optical signal reflected from the mirror segment is incident on the inclined segment region, the optical signal is refracted on the inclined segment region and guided outside of the clad layer 5. Thus, the optical signal can be prevented from being reflected from the clad surface. The segment region is inclined at a predetermined angle within a range 5° to 20°, preferably, within a range of 8° to 15°, to the flat surface of the clad 2.

In the above describe configuration, the mirror face may be inclined at an angle other than the angle of 45°. If the mirror face is formed as the interface between the cavity and core 4, the mirror face is preferably inclined at a predetermined angle other than 45°, within a range of 25° to 55° to the flat surface of the clad 2, to suppress a part of the optical signal from being refracted on the interface and to enhance the total-reflection efficiency on the mirror face. In the configuration in which the mirror face is inclined at the angle other than the angle of 45°, the clad layer is preferably provided with the inclined segment region so as to control the refraction of the optical signal on the inclined segment region and guide the optical signal in a predetermined direction outside the clad layer.

The present invention is not limited to the embodiments described above. For example, a optical connection board according to the invention may be made of materials other than, and may have dimensions other than, those specified above. Although not described above, the electric wiring provided in each embodiment may be formed below or above the optical waveguide. If the mirrors are of metal, they may be parts of the electric wiring. The electric wiring may be formed within the same plane as the optical waveguide core as shown in FIG. 19.

Figure 19:
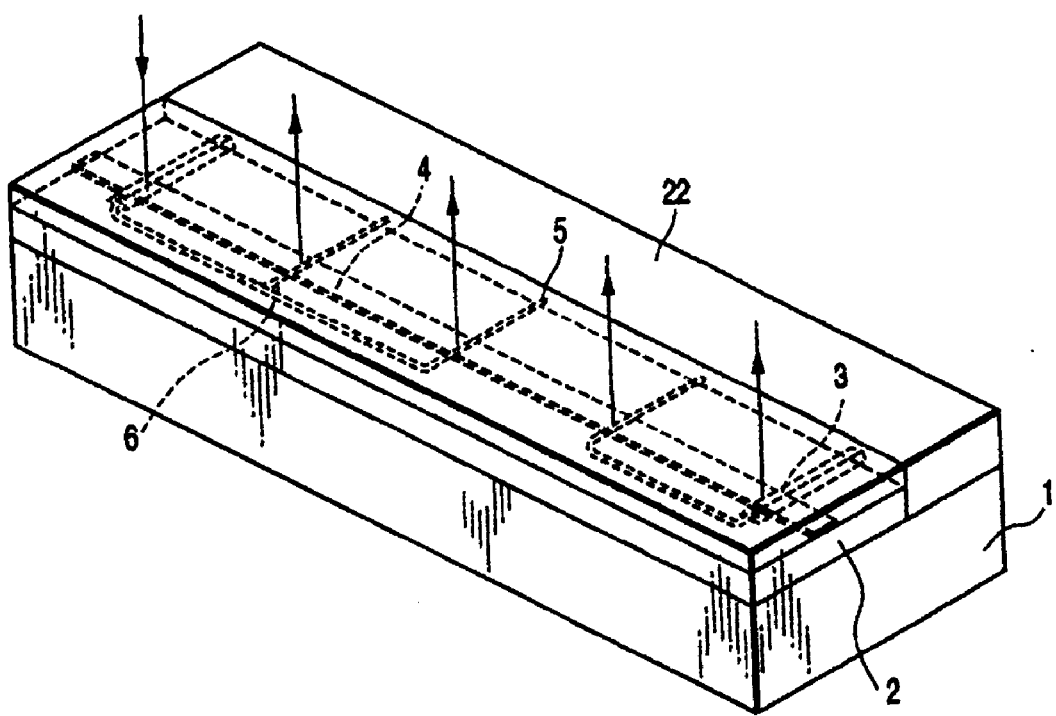
FIG. 19 is a perspective view of an optical and electrical connection board according to a modified embodiment of the invention.

FIG. 19 is a composite structure of an optical and electrical circuit board according to a modified embodiment of FIG. 5. In FIG. 19, the component similar to those shown in FIGS. 3 and 4 are designated at the same reference numerals, and will not described in detail. In the composite structure of FIG. 19, an optical waveguide provided with the termination mirrors 3 and split mirror 6, and an integrated circuit 22 including active and/or passive electric elements are formed on the same substrate 1 and the termination mirrors 3 and split mirror 6 is made of electric conductive metal and electrically connected to the integrated circuit 22. Thus, the mirrors 3, 6 have an optical function of reflecting the optical signal and an electric function of connecting the elements in the integrated circuit 22, to supply a signal therebetween. The pattern of the mirror may be variously designed to achieve a preferred electrical wiring in an area other than the optical waveguide core 4 on the clad layer 2. In the structure shown in FIG. 19, the optical and electrical coupling can be designed in a compact integrated device.

Moreover, in the embodiments described above, the optical waveguide may be a multi-layered one, in which two or more optical connection boards are arranged one above another and optically coupled to each other.

In the optical interconnection circuit board according to an aspect of the present invention, because it contains a 45° mirror for transforming the optical coupling direction by 90° in its optical waveguide, no mechanically processed portion exists in the optical waveguide or no outside mirror is provided, so that it is a completely flat board when seen from outside. For the reason, it is not necessary to consider unevenness in the optical wiring in mounting process for mounting components or upon wiring pattern design. Further, because basically, there is no mechanically processed portion, there is no fear that the mirror face or the mechanically processed portion may be polluted or stained in solder reflow step or in cleaning step for removing flux.

Further, the optical interconnection circuit board according to an aspect of the present invention not only achieves the same optical bus function as the conventional technology with the split mirrors but also prevents irradiation of light out of the optical waveguide at an optical waveguide end portion with the termination mirror and reflection of light in an opposite direction, thereby achieving a complete optical termination. Consequently, crosstalk with other optical waveguide and multiple reflection within the optical waveguide can be suppressed.

Further, the optical transmission coupling efficiency can be 100% by using the termination mirror as a transmission portion optical coupler of an optical distribution type wiring. That is, according to an another aspect of the present invention, it is possible to obtain a surface-mounting type optical interconnection circuit board in which crosstalk between the optical waveguides and multiple reflection noise within the optical waveguide can be suppressed so as to minimize optical coupling loss of the optical input/output portion.

According to the manufacturing method of the optical interconnection circuit board according to a yet another aspect of the present invention, basically, the split mirrors and the termination mirrors are produced on a flat substrate and the formation pattern thereof can be determined by photo lithography or metal mask vapor deposition to the flat surface. Thus, the same productivity as for multi-layer substrate in ordinary electric wiring board is assured and the wiring pattern and mirror direction can be adjusted by changing photo mask or metal mask. Therefore, the optical interconnection circuit board and the manufacturing method thereof according to the yet another aspect of the present invention accelerate cost reduction and general-purpose use of optical wiring board, so as to facilitate application to system, thereby contributing to establishment of higher grade of super-fast information communication system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical interconnection circuit board configured to guide an optical signal, comprising:

a substrate having a surface;

a first clad layer having a flat surface formed on the surface of the substrate;

a core layer configured to guide the optical signal in a predetermined direction, the core layer being formed on the flat surface of the first clad layer and extended in the predetermined direction;

a second clad layer formed on the core layer;

a first mirror segment having a first mirror face configured to reflect the optical signal guided in the core layer through the second clad layer to the outside thereof, the first mirror segment being formed on the flat surface of the first clad layer and the mirror face being contacted to the core layer; and an electric circuit configured to generate an electrical signal, the electric circuit having a wiring pattern formed on the flat surface of the first clad layer, wherein the first mirror segment and the wiring pattern are made of electric conductive metal and the first mirror segment is electrically connected to the electric circuit.

2. The optical interconnection circuit board according to claim 1 further comprising:

a second mirror segment having a second mirror face configured to reflect the optical signal into the core layer, the optical signal being incident on the second mirror face from the outside of the circuit board through the second clad layer, the second mirror segment being formed on the flat surface of the first clad layer and the minor face being contacted to the core layer.

3. A method of manufacturing an optical interconnection circuit board for guiding an optical signal, comprising preparing a substrate having a surface, forming a first clad layer having a flat surface, on the surface of the substrate;

forming a first mask layer on the first clad layer, the first mask layer having a first opening region;

forming a second mask layer on the first mask layer, the second mask layer having a second opening smaller than the first opening, the second opening being substantially aligned with the first opening and;

depositing a minor layer on the first clad layer through the first and second openings to form a minor on the first clad layer, the minor having a reflection face thereon and having a first height;

removing the first and second mask layer;

forming a core segment on the first clad layer to embed the minor in the core segment, the core segment having a second height not greater than the first height and being so extended as to have a predetermined optical circuit pattern; and covering the core segment with a second clad layer.

4. The method according to claim 3, further comprising:

forming a shield layer on the second clad layer;

forming a cover layer on the shield layer, the cover layer having a coupling hole configured to allow the optical signal to pass therethrough; and etching the shield layer under the coupling hole of the cover layer to form a coupling portion configured to align the optical interconnection circuit board with an optical unit.

5. A method of manufacturing an optical interconnection circuit board according to claim 3, wherein the first and second mask layers include first and second resist layers, respectively.

6. A method of manufacturing an optical interconnection circuit board according to claim 3, wherein the first and second mask layers include a resist layer and a metal layer, respectively.

* * * * *